United States Patent [19]
Yoshida

[11] Patent Number: 4,744,606
[45] Date of Patent: May 17, 1988

[54] WHEEL COVER FOR VEHICLE

[75] Inventor: Takao Yoshida, Kawaguchi, Japan

[73] Assignee: Honda Giken Kogyo Kabushiki Kaisha, Tokyo, Japan

[21] Appl. No.: 872,555

[22] Filed: Jun. 10, 1986

[30] Foreign Application Priority Data

Jun. 14, 1985 [JP] Japan .................. 60-128008
Jul. 26, 1985 [JP] Japan .................. 60-114964[U]
Dec. 19, 1985 [JP] Japan .................. 60-286479

[51] Int. Cl.⁴ .................................. B60B 3/00
[52] U.S. Cl. .................. 301/6 CS; 301/37 R; 296/198; 280/289 R
[58] Field of Search .......... 280/289 R, 289 G, 289 S, 280/152.1, 152.2; 180/65.1, 68.1, 229; 301/37 R, 37 P, 37 N, 37 T, 37 S, 6 R, 6 CS, 6 V, 125, 5 R; 296/78.1, 198

[56] References Cited

U.S. PATENT DOCUMENTS

| | | | |
|---|---|---|---|
| 2,130,207 | 9/1938 | Van Halteren | 301/37 S |
| 2,441,008 | 5/1948 | Chase | 301/37 C X |
| 2,687,192 | 8/1954 | Butterfield | 301/6 CS X |
| 2,940,555 | 6/1960 | Hibbard | 301/37 PB X |
| 3,103,369 | 9/1963 | Gaines et al. | 301/37 S X |
| 4,045,096 | 8/1977 | Lidon | 301/5 R X |
| 4,441,574 | 4/1984 | Kohyama et al. | 296/198 X |

FOREIGN PATENT DOCUMENTS

| | | | |
|---|---|---|---|
| 703657 | 3/1941 | Fed. Rep. of Germany | 296/78.1 |
| 998118 | 1/1952 | France | 296/78.1 |

Primary Examiner—Johnny D. Cherry
Assistant Examiner—Russell D. Stormer
Attorney, Agent, or Firm—Lahive & Cockfield

[57] ABSTRACT

A small vehicle equipped with a disk brake system wherein
a wheel cover for a wheel of said small vehicle includes
a first pair of left and right annular first covers, this first pair
  having a plurality of air exhaust ports arranged in a peripheral direction,
  being fixed to walls of a wheel rim to which a wheel spoke section is connected, and
  extending generally toward the axis of the axle of this wheel; and
a second pair of left and right second covers, this second pair
  having air intake ports capable of receiving air while the wheel is rotating,
  being connected with wheel supporting means, and covering, in cooperation with the first covers, both sides of the wheel, including brake caliper means associated therewith, and forming inner chamber housing portions of this wheel.

3 Claims, 3 Drawing Sheets

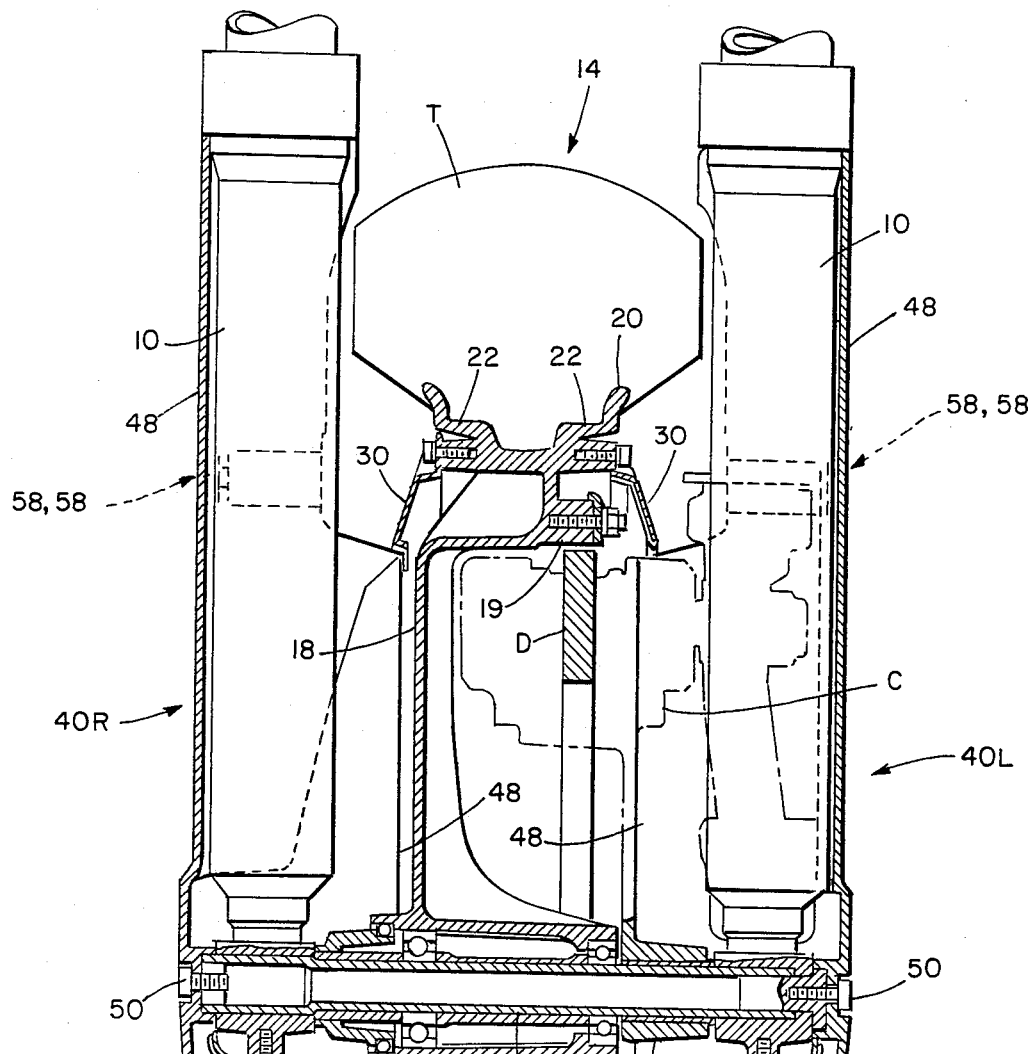
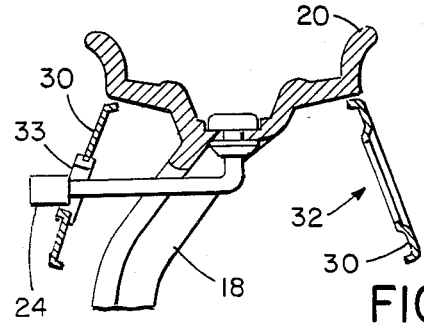
FIG. 3
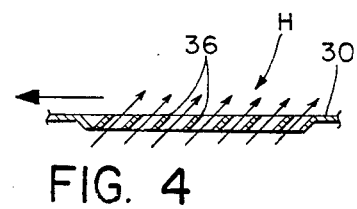
FIG. 4
FIG. 2

WHEEL COVER FOR VEHICLE

GENERAL BACKGROUND OF INVENTION

The present invention relates to a wheel cover for a small vehicle, such as a motorcycle and/or a tricycle, and particularly to a wheel cover for a small vehicle equipped with a disk brake system.

In a disk brake system for a motorcycle, a rotating disk (fitted integrally to one side or each side of a wheel) is generally exposed to air, and therefore, friction heat generating during braking is dissipated by air while the vehicle is moving, i.e. running. However, when the sides of a wheel including a rotating disk are covered with covers in order to prevent the disk brake system from contamination, it is difficult for the rotating disk to receive air. In view of this, methods were employed in the past for improving the heat dissipation effect of the rotating disk, by enlarging the rotating disk in area, by adaping a ventilated disk, or by providing the cover with air intake ports (see Patent Publication No. Sho 58-88237 and Patent Publication No. Sho 58-84238, for example).

However, enlarging a rotating disk in area is limited by relation with wheel shape, employing a ventilated disk increases weight as compared to an ordinary rotating disk, and providing a cover with air intake ports requires means for air exhaustion.

The object of the present invention is, when a wheel of a small vehicle equipped with a disk brake system is covered with a wheel cover, to provide means for performing its cooling effectively, regardless of the shape of its rotating disk.

This object is accomplished by fixing a pair of left and right, annular first covers, extending toward the axis of the wheel axle, to the inner or back wall means of a rim to which a wheel spoke section is connected. The first covers rotate with the wheel and are provided with a plurality of air exhaust ports arranged in the peripheral direction. A pair of left and right second covers cooperate with the said first covers on both sides of the wheel to form inner chambers cooperatively and generally housing wheel components including brake caliper means. The second covers are provided with an air intake port means capable of catching, i.e. receiving, air while running and are carried by wheel support means so as to be relatively fixed—i.e. not mounted for rotation with the wheel.

By this arrangement, air which enters through the air intake port means of at least one of the second covers, which is fixed to a wheel supporting member side, passes the inner chamber means formed with the wheel cover, dissapates friction heat generated by frictional sliding contact between the rotating disk and friction pad means of the caliper means, and is exhausted outside through the air exhaust ports means of the first cover means that rotate together with the wheel.

In describing this invention, reference will be made by way of example, but not limitation, to a preferred embodiment of the invention illustrated in the appended drawings.

DRAWINGS OF PREFERRED EMBODIMENT

In the drawings:

FIG. 1 provides a schematic, side elevantional view of a portion of the front wheel of a motorcycle fitted with the wheel cover in accordance with an embodiment of this invention;

FIG. 2 provides a longitudinal sectional view of a detail of FIG. 1 as viewed from in front of the motorcycle;

FIG. 3 provides a transverse sectional view of a detail of FIG. 1; and

FIG. 4 provides a detail sectional view of the wheel cover in accordance with a modified embodiment and is a sectional view along line IV—IV of FIG. 1.

DETAILED DESCRIPTION

Figure 1:
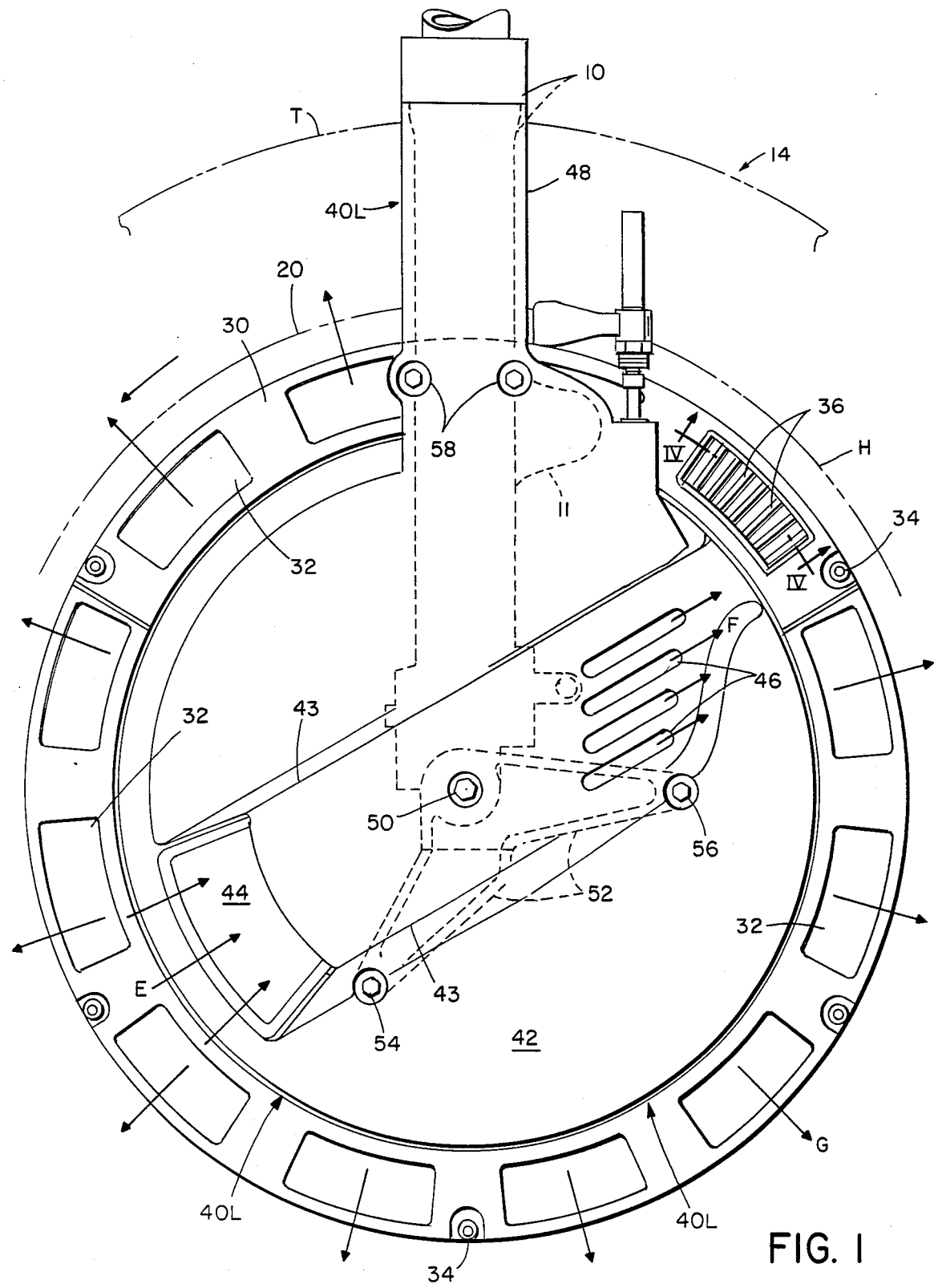

In the drawings, reference numerals and letters have been applied to certain apparatus elements. In order to facilitate the ensuing detailed discussion, certain elements should be recognized at the outset of the discussion and these include:

| | |
|---|---|
| 10 - bottom case | 43 - bulged section |
| 11 - projected piece | 44 - air intake port |
| 12 - axle | 46 - small air exhaust port |
| 14 - front wheel | 48 - fork pipe cover |
| 16 - hub | 50 - screw |
| 18 - spoke section | 52 - supporting piece |
| 19 - projection | 53 - screw |
| 20 - rim | 54 - screw |
| 22 - projection | 56 - screw |
| 24 - air valve | 58 - screw |
| 30, 30 - first covers | C - caliper |
| 32 - air exhaust port | D - rotating disk |
| 33 - opening | T - tire |
| 34 - screw | |
| 36 - fin | |
| 40L, 40R - second covers | |
| 42 - disk shaped main section | |

By referring to FIGS. 1 to 4, an embodiment of the present invention will now be described.

FIG. 1 is a schematic left-hand side view showing a front wheel 14 of a motorcycle and FIG. 2 is a longitudinal sectional view of a detail of FIG. 1, as viewed from in front of the motorcycle.

The front wheel 14 is rotatably supported by an axle 12. This axle 12 connects the lower ends of left and a right fork or case members 10, 10. Wheel 14 includes a hub 16, a spoke section 18 extending radially from the hub 16, a rim 20 connected to the outer end of said spoke section 18, and a tire T fitted to the rim 20. A disk brake system is provided for the front wheel 14 and includes a rotating wheel disk D and a fixed caliper C equipped with a friction pad. The rotating disk D is secured to a wheel projection 19 with a plurality of threaded holes provided on the spoke section of the front wheel 14. The caliper C is supported by the axle 12 and connected to a projected piece 11 (FIG. 1) of the bottom case of fork 10 by a connecting member not shown, so that braking force is transmitted to the bottom case or fork means 10.

Annular first covers 30, 30, which may be made of plastic, are secured with a plurality of screws 34 to a plurality of projections 22 located at left and right sides of the front wheel 14 and formed on the back wall (wall on the axle 12 side) of the rim 20. These first covers 30, 30 extend toward the axle 12 side, i.e. the axis of axle 12, and have a plurality of air exhaust ports 32 of approximately rectangular shape formed at equal intervals in the peripheral, i.e. circumferential, direction. A filler opening for an air valve 24 may be provided, as shown in FIG. 3, comprising an opening 33 located between a pair of exhaust ports 32, 32.

Second covers 40L, 40R, which may also be of plastic, are provided which cooperate with the first covers 30, 30 to substantially cover the left and right sides of the front wheel 14 to form inner chambers A.B. The second covers 40L, 40R are fixed to the lower ends of the bottom case or fork means 10, 10 with screws 50, 50 screwed into the ends of the axle 12 and are fixed to both ends of metal supporting pieces 52, 52. Members 52 may be of approximately triangular shape and be fixed to the lower ends of the bottom cases 10, 10 with screws 53. Second covers 40L, 40R are secured with screws 50 and with screws 54, 56, (connecting with members 52) and furthermore, are fixed with a pair of screws 58 to a fork pipe cover section 48. These sections 48 may be U-shaped in transverse cross section so as to shroud the outer portions of fork means 10, 10 and extend upwardly from disk shaped main sections 42. Sections 42 are located at sides of the hub 16 and spoke section 18, to cover the bottom fork cases 10, 10 from the outside.

First covers 30, 30 are rotable relative to "fixed" second covers 40L, 40R but are substantially close at their areas of radial proximity, as shown in FIG. 2.

As shown in FIG. 1, cover section 42 is provided with a bulged section 43 which may be of rectangular shape. Section 43 is disposed in a slanting posture, rising rearwardly as viewed from a side of the body frame and is formed on the disk shaped main section 42 of the second cover 40L that covers the rotating disk D and caliper C. Its front portion is opened to form an air intake port or scoop 44 and its rear portion is provided with a plurality of small air exhaust ports 46.

The preferred embodiment is thus composed as described above. With this embodiment, when the motorcycle is running, air E enters into the inner chamber A from the air intake port 44 formed on the bulged section 43 of the second cover 40L, and takes off heat from the rotating disk D and the friction pad of caliper C that have risen in temperature due to generation of heat during braking. This air is exhausted outside from the small air exhaust ports 46 (see arrows F) and is also exhausted outside through the air exhaust ports 32 of the first covers 30 that rotate together with the front wheel 14 (sse arrow G).

As can be seen from the foregoing, in this embodiment, because the wheel cover is constituted with first covers 30, 30 and second covers 40L, 40R, the first covers 30 being fitted to the back wall fo the rim 20, and because this cover completely covers the hub 16 and spoke section 18 and disk plate D of the front wheel 14, it is possible to effectively prevent the disk brake system from contamination and influence of rainwater. Because of the provision of air intake port 44, small air exhaust ports 46, and air exhaust ports 32, it is possible to remove generated heat developed as a result of braking with particular effectiveness.

Further, by fitting the first covers 30 to the back wall of the rim 20, sufficiently separated from the axis of the axle, it is possible to maximize the wheel cover in diameter and to form a multiplicity of air exhaust ports 32 in its peripheral direction, thereby enabling improved cooling efficiency for the disk brake system.

As shown by arrow H in FIG. 1, it is considered effective to further provide exhaust port means 32 with fins 36 in a slanting posture, thus additionally promoting air exhaustion (see FIGS. 1 and 4).

As is clear from the foregoing description, in the present invention, a pair of left and right annular first covers extend from a wheel rim toward the wheel axle. These first covers are fixed to the back wall of a wheel rim to which a wheel spoke section is connected. The first covers are provided with a plurality of air exhaust ports arranged in a circumferential direction or pattern. A pair of left and right second covers cooperate with the first covers to cover the sides of the wheel (including brake caliper means) and on so doing form inner chambers carried by the wheel support means. Because at least one second cover is provided with an air intake port to catch air while running, it is possible to effectively prevent the disk brake system from contamination and for air scooped in through the air intake port and entering into the wheel cover to be exhausted through the air exhaust ports of the first covers that rotate together with the wheel. This arrangement performs efficient cooling of the rotating disk and friction pad of the disk brake system. Furthermore, because of adopting construction where the first cover is fixed to the back wall of the rim, it is possible to maximize the first cover in diameter, to ensure a sufficient exhaust area and to enhance the heat reduction effect.

In conclusion, and by way of summary, it may be observed that this invention entails a preferred embodiment wherein a small vehicle is equipped with a disk brake system and a wheel cover means including a first pair of left and right annular first covers (30), this first pair having a plurality of air exhaust ports (32) arranged in a peripheral direction, being fixed to wall means of a wheel rim (20) to which a wheel spoke section (18) is connected, and extending generally toward the axis of the axle (12) of said wheel; and a second pair of left and right second covers (40L, 40R), this second pair having air intake port means (44) capable of receiving air while said wheel is rotating, being connected with wheel supporting means (10, 12), and covering, in cooperation with said first covers, both sides of the wheel, including brake caliper means (C) associated therewith, and forming inner chamber means housing components of said wheel.

With this arrangement the second pair of covers may be non-rotatable with the wheel, with at least one cover thereof providing air intake scoop means continuously oriented to effectively catch input air, and with the rotating first pair of covers serving to centrifugally exhaust air via the exhaust ports thereof.

With the invention having been described in detail, those familiar with this disclosure and skilled in the art may recognize additions, deletions, substitutions, modifications, and/or equivalents with respect to some or all elements, all of which would fall within the scope of the invention as set forth in the appended claims.

What is claimed is:

1. In a small vehicle equipped with a wheel, an associated disk brake system and wheel supporting means; wherein said wheel includes a wheel rim, wheel cover supporting wall means, on said wheel rim and a wheel spoke section, the improvement residing in wheel cover apparatus comprising:

a wheel cover for a wheel of said small vehicle including a first pair of left and right annular first covers, said first pair
  having a plurality of air exhaust ports arranged in a peripheral direction, and
  being fixed to said wall means on said wheel rim to which said wheel spoke section is connected, and
  extending generally transversely of the axis of the axle of said wheel; and
a second pair of left and right second covers, said second pair
  having air intake port means capable of receiving air while said wheel is rotating,
  being connected with said wheel supporting means, and
said first and second covers being generally contiguous and cooperating to define inner chamber means housing portions of of said wheel and covering sides of said wheel, including said brake caliper means.

2. A small vehicle wheel cover as described in claim 1 wherein:
  at least one of said second covers is relatively fixed in position and orients said intake port means to define air scoop means facing in the direction of vehicle travel, and
  at least one of said first covers is rotatable with said vehicle wheel to cause centrifugal exhaustion of air from said inner chamber means through said exhaust ports.

3. A small vehicle wheel cover as described in claim 2 furhter wherein:
  a supplemental air exhaust port is provided and carried by said at least one of said second covers.

* * * * *